Oct. 18, 1960  G. E. ALGATT ET AL  2,956,332
MACHINE FOR MANUFACTURING PIN ELECTRODES
Filed Dec. 8, 1958  4 Sheets-Sheet 1

INVENTORS
G.E. ALGATT
K.A. SCHMULDT
By W.C. Johnson
ATTORNEY

INVENTORS
G. E. ALGATT
K. A. SCHMULDT

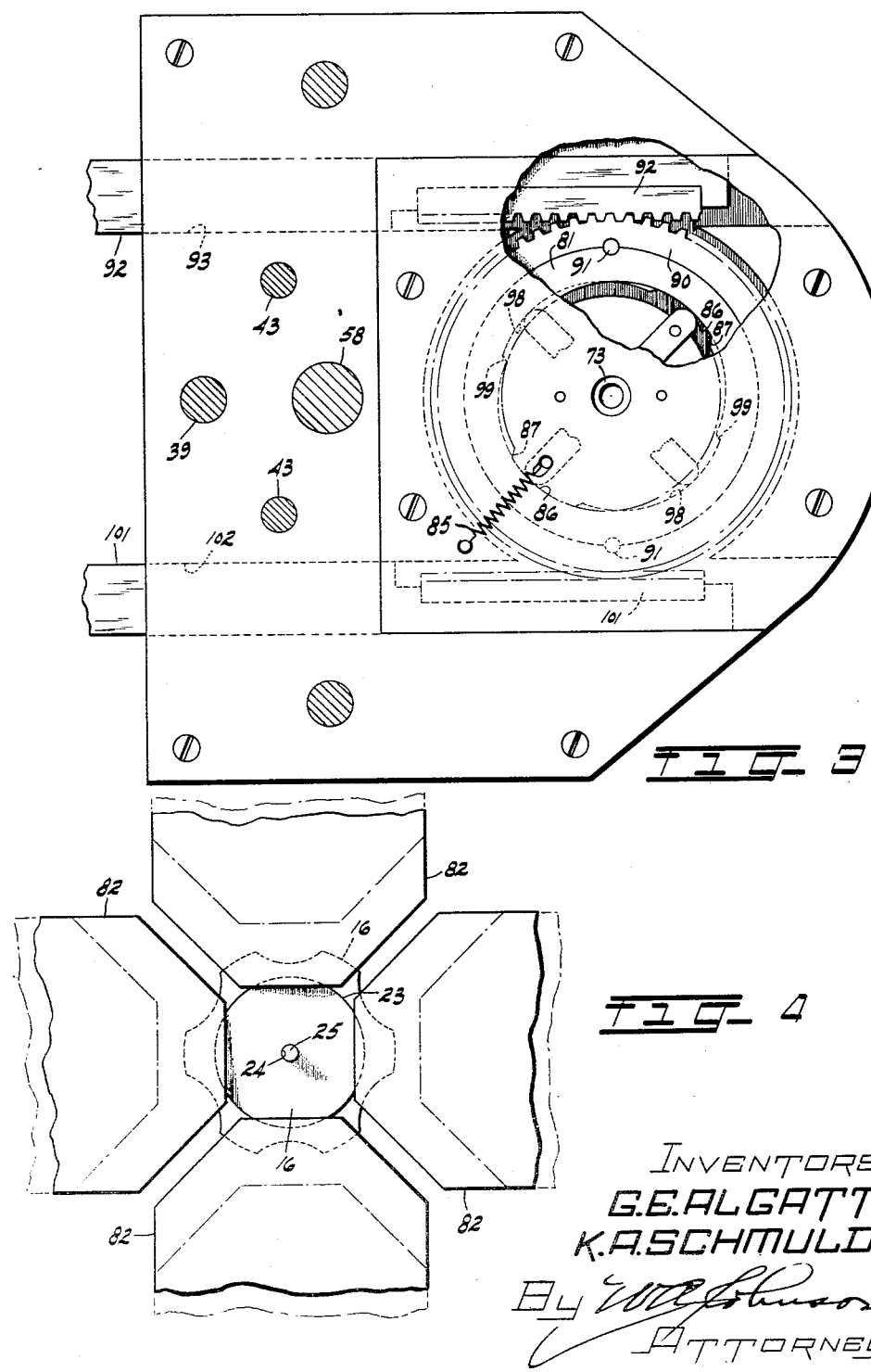

Oct. 18, 1960 G. E. ALGATT ET AL 2,956,332
MACHINE FOR MANUFACTURING PIN ELECTRODES
Filed Dec. 8, 1958 4 Sheets-Sheet 4

INVENTORS
G.E.ALGATT
K.A.SCHMULDT
By [signature]
ATTORNEY

United States Patent Office 2,956,332
Patented Oct. 18, 1960

2,956,332

MACHINE FOR MANUFACTURING PIN ELECTRODES

George E. Algatt, Allentown, and Karl A. Schmuldt, Emmaus, Pa., assignors to Western Electric Company, Incorporated, New York, N.Y., a corporation of New York Filed Dec. 8, 1958, Ser. No. 778,871

6 Claims. (Cl. 29—25.3)

This invention relates to apparatus for making articles, particularly varistor components, of apertured studs and lengths of wire.

In the present instance point contact electrodes for varistors are formed of small brass studs, which are apertured centrally for a portion of their length, and tungsten wire which is fed into the aperture of each stud, secured therein and cut a given distance from the stud. The smallness of the studs and a fineness of the wire make it difficult to assemble articles of this type and to perform subsequent operations thereon to produce the required S-shape bends in the wires.

The object of the present invention is an apparatus which is completely automatic and highly efficient in forming articles of apertured studs and lengths of wire.

According to the object the invention comprises an apparatus for making articles of apertured studs and lengths of wire wherein the studs are located successively at a fixed position where means is operated to feed the leading end of a supply of wire into the apertures of successive studs, and other means are operable to swage the stud to secure the end of the wire therein and to cut the wire a given distance from the stud.

More specifically, the apparatus is of the turret type with stud receiving and supporting chucks mounted at spaced positions about the turret which is moved intermittently to place the chucks at successive stations. At one of the stations studs are fixed automatically to the chucks. At another station various operations take place including feeding of the leading end of a wire into the aperture of the stud, swaging the stud about the wire to secure the leading end in the stud and cutting the wire a given distance from the stud. At other stations successive operations are performed on the wire to form S-shape bends therein.

Other objects and advantages will be apparent from the following detailed description when considered in conjunction with the accompanying drawings wherein:

Fig. 3 is a fragmentary sectional view taken along the line 3—3 of Fig. 2;

Fig. 4 is an enlarged fragmentary detailed view of the swaging elements;

Figure 1:
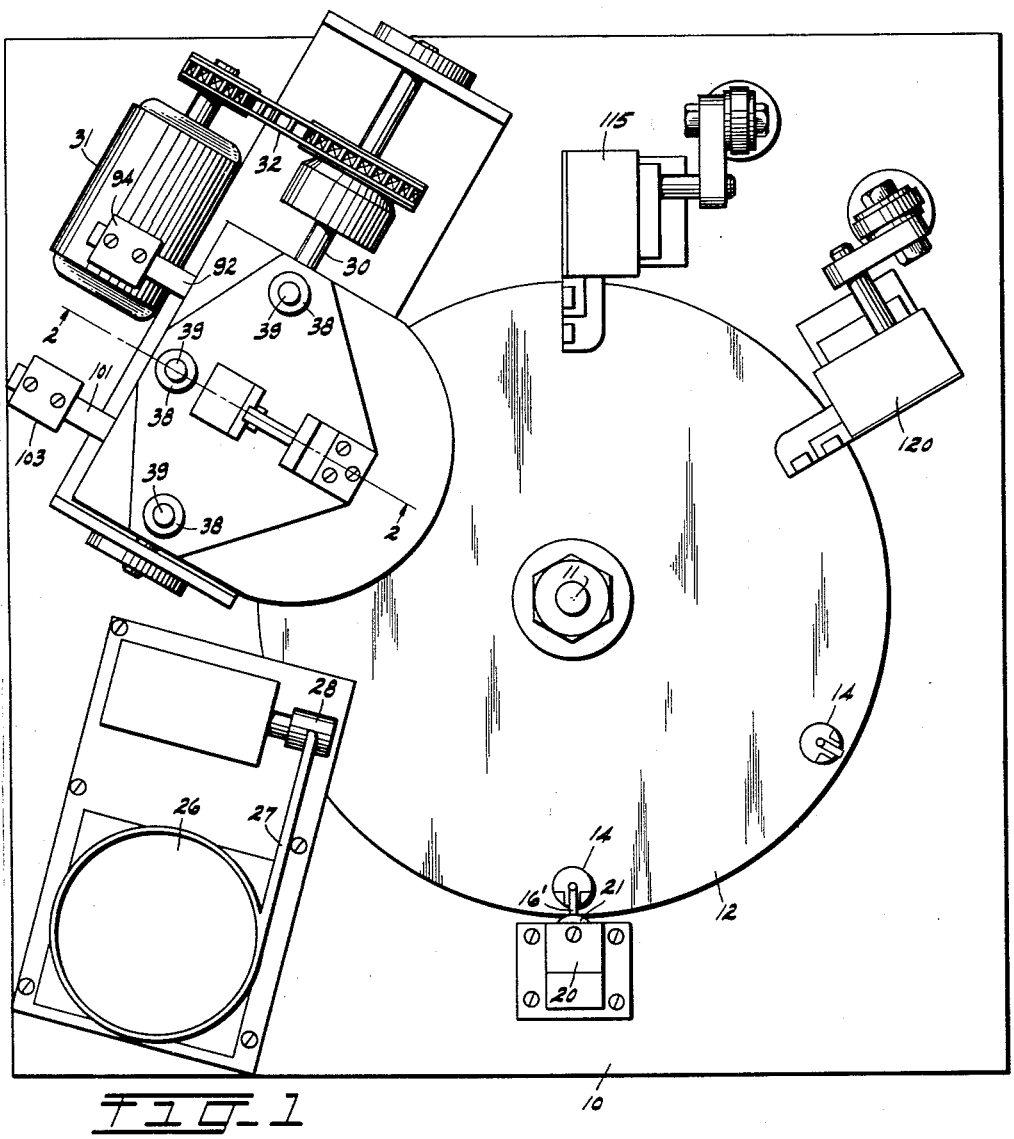
Fig. 1 is a top plan view of the apparatus.

The apparatus shown in Fig. 1 includes a table 10 which supports a shaft 11 for a turret 12. The means for supporting a shaft 11 and also the means for moving a turret intermittently are not shown as any suitable means may be employed for these purposes.

Figure 7:
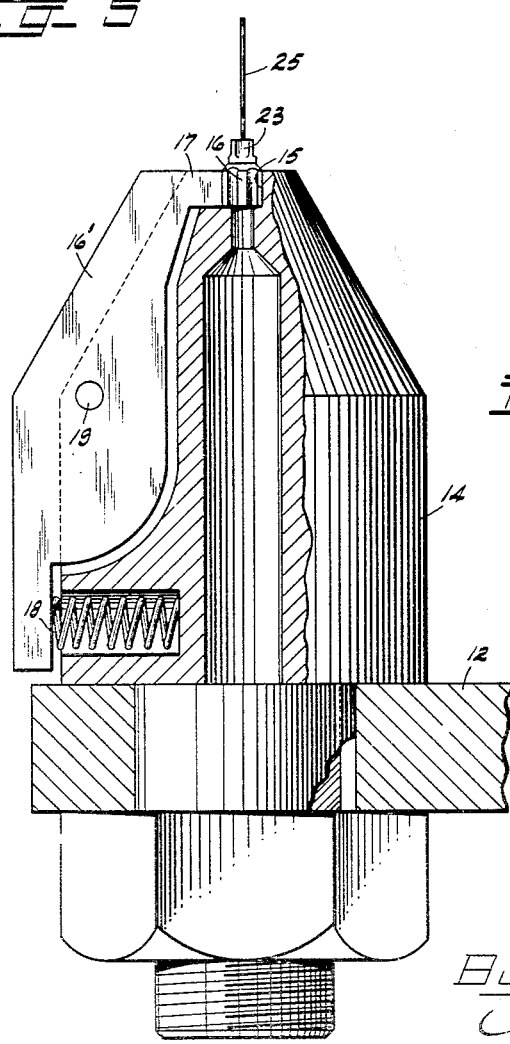
Fig. 7 is an enlarged vertical sectional view of one of the chucks.

The turret 12 has radially positioned chucks 14 mounted, as illustrated in Fig. 7, adjacent the periphery of the turret.

Each chuck has a recess 15 in its upper end to receive a stud 16. Also, each chuck is provided with a latch type holder 16' having a portion 17 to enter a notched side of the recesses 15 to engage the stud and is normally urged by a spring 18 about its pivot 19. At the bottom of Fig. 1 a solenoid 20 is mounted and energized during each rest interval to cause its core 21 to move the holder 16' of the chuck in what may be defined as the ejecting station into open position to free the finished article for removal from the chuck so that the chuck, when moved to the next station, may receive another stud 16. The studs 16 are of the general contour shown in side elevation in Fig. 7 and in plan view of Fig. 4 and have upper portions 23 which are smaller than the main or lower portions. The smaller portions 23 are apertured centrally at 24 to receive the leading end of a wire 25. The studs are located initially in a feeding unit 26 of the vibrating type which causes the studs to feed successively down a chute 27 to a unit 28 which will operate to drop the studs singly into the recesses 15 of the chucks 14.

Figure 2:
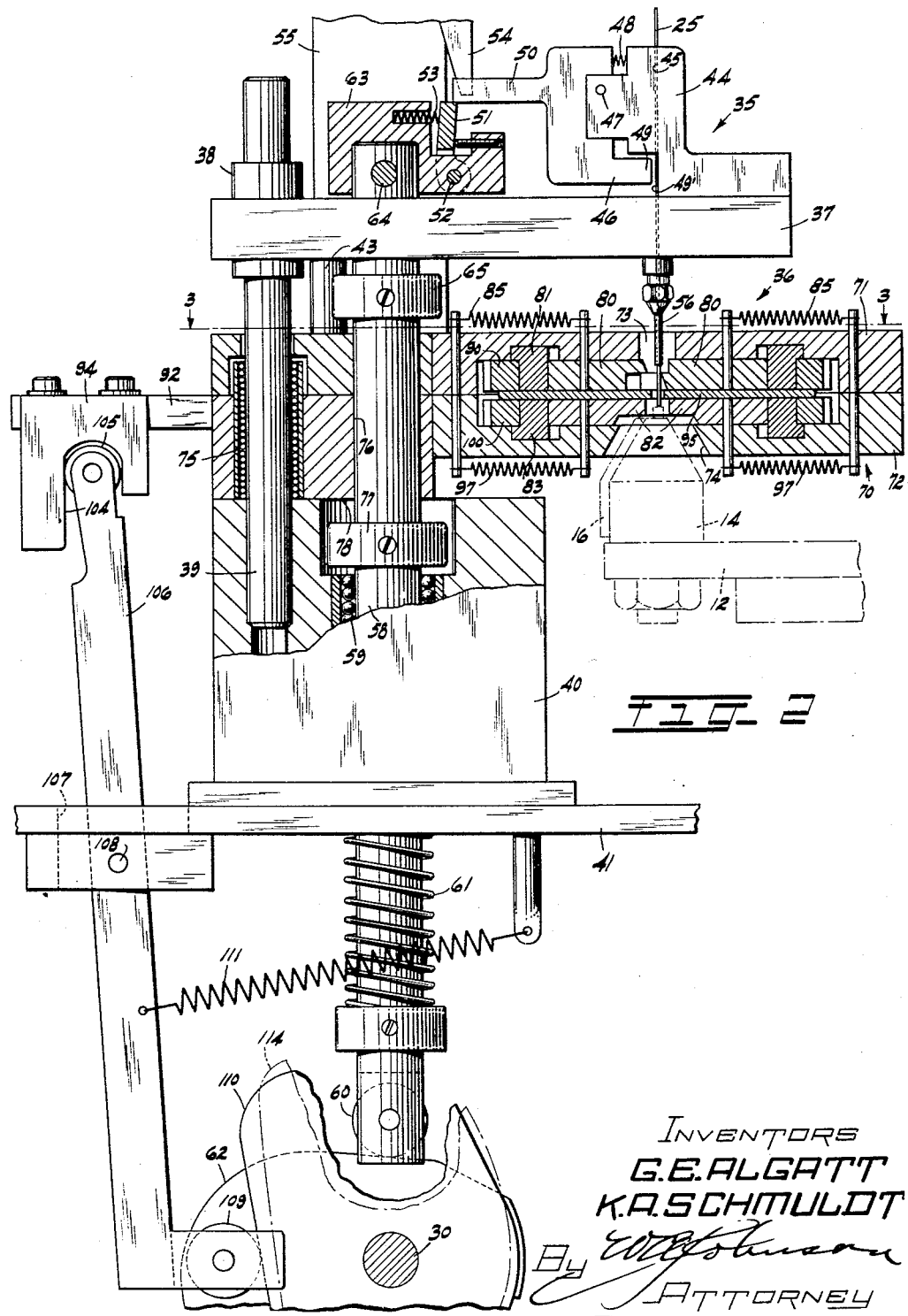
Fig. 2 is a fragmentary vertical sectional view taken along the line 2—2 of Fig. 1.
Figure 5:
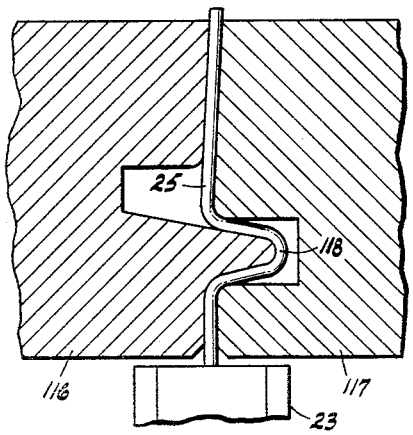
Fig. 5 is an enlarged fragmentary sectional view of one of the wire forming units.
Figure 6:
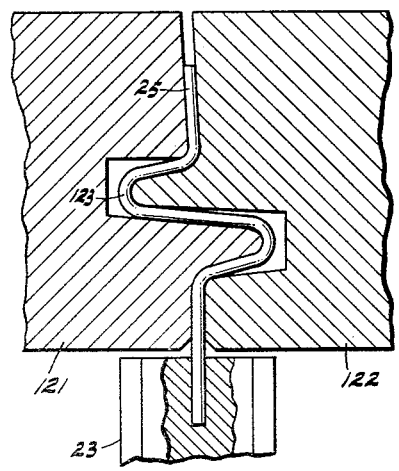
Fig. 6 is an enlarged fragmentary sectional view of the other wire forming units.

The mechanism at the next station is under the control of cams mounted on a cam shaft 30 and driven by motor 31 through the connection 32. This structure is shown more in detail in Fig. 2 which illustrates units 35 and 36. The unit 35 is mounted on a support 37 which has bushings 38 movably disposed on parallel vertical rods 39. The rods 39 have their lower ends fixedly mounted in a stationary block 40 mounted on a fixed support 41. The support 37 is limited in its downward movement by one or more spacing members 43 mounted on the unit 36 for controlling the location of the unit 35 with respect to the unit 36 when they are both in their operating position. The unit 35 includes a fixed member 44 mounted thereon and apertured at 45 for the wire 25. A movable member 46 pivotally mounted at 47 on the fixed member 44 is urged normally by a spring 48 to have its jaw 49 engage the wire and hold it against a flat surface 49' of the fixed jaw 44. An arm 50 of the movable member 46 is positioned to be engaged by a latch 51 which functions to hold the member 46 in an opened position, to free the wire 25, and actuable about its pivot 52 against the force of a spring 53 by a station cam 54 to free the projection 50 to allow the member 46 under the force of its cam 48 to engage the wire. The cam 54 is mounted on a stationary vertical member 55.

The exit end of the unit 35 includes a tubular member 56 which is in the form of a hypodermic needle to receive the wire near the leading end thereof and guide it accurately into the aperture 24 of each stud. The unit 35 is moved vertically between the normal upper position and the operating position shown in Fig. 2 by a push rod 58 which extends downwardly through a bearing 59 in the block 40 and has a cam follower 60 mounted on the lower end thereon. The rod 58 is urged downwardly by a spring 61 to follow the contour of a cam 62 which is mounted upon the cam shaft 30. The upper end of the rod 58 has a holder 63 for the latch 51 mounted at 64 thereon. A collar 65, secured to the rod 58 and located a short distance below the support 37 when in the operating position, serves to support the unit 35 and to permit advance upper movement of the latch 51 to open the wire clamp, or the movable member 46, prior to the start of the vertical movement of the unit 35.

The unit 36 is formed of a housing indicated generally at 70 and composed of various parts including main portions 71 and 72 which in assembly have aligned apertures 73 and 74 respectively. The housing 70 has suitable bearings or bushings 75 for the guide pins 39 on which the housing may be moved vertically. The housing also has a vertical aperture 76 for the rod 58 to move freely therein. A collar 77 mounted on the rod 58 in the position shown in Fig. 2 will engage the lower edge 78 of the housing after the collar 65 has engaged the support 37 and moved the unit 35 upwardly. The portions 71 and 72 of the housing 70 have recessed portions respectively for cutters 80 and a circular cam 81 of the portion 71 and swaging elements 82 and a circular cam 83 of the portion 72. The cutters 80 are disposed in aligned grooves in the member 71 and are urged outwardly by springs 85 to follow the contour of their cam 81. The inner periphery of the cam 81 has low portions 86 normally engaging rounded ends of the cutters 80 and high portions 87 which are moved into engagement of the outer ends of the cutters to force the cutters to cut the wire 25. The inner ends of the cutters are provided with suitable cooperating cutting edges to overlap when the high portions 87 of the cam 81 move the cutters inwardly toward each other.

The cam 81 is mounted in a ring gear 90 and keyed thereto at 91. A rack 92 slidable in a guide-way 93 interengages the gear 90 and extends to the left where it is provided with a yoke 94. The yoke 94 is disengaged from its actuating means when the unit 36 is in its normal up position but is caused to interengage its actuating mechanism when moved into the down or operating position.

In the present instance there are four swaging elements 82 as illustrated in Fig. 4. These elements are slidably mounted in grooves in the portion 72 of the housing 70 and are separated from the cutters by a dividing element 95. The inner ends of the swaging elements have the contours as shown in Fig. 4 so that they may be moved simultaneously into engageemnt with the four sides of the portion 23 of each stud 16 to swage this portion, forcing the material thereof to flow tightly about the leading end of the wire disposed in the aperture 24. The outer ends of the elements 82 are rounded and urged by springs 97 to follow the contour of the inner periphery of the cam 83. The cam 83 has low portions 98 normally engaging the outer ends of the swaging elements 82 and high portions 99 which are moved into engagement with the swaging elements to move them inwardly to swage the portion 23 of each stud. The cam 83, like the cam 81, is supported for rotation about its axis in the annular groove of its housing portion and is keyed to a ring gear 100. The ring gear 100 interengages a rack 101 which is movable longitudinally in a guide-way 102 and has a yoke 103 mounted on the outer end thereof. In reality the rack 101 includes a toothed portion mounted on a slidable arm. The yokes 94 and 103, shown at their spaced positions in Fig. 1, are bifurcated at 104 to straddle their respective rollers 105 mounted on the upward ends of their like cam levers 106. The levers 106 extend through apertures 107 in the main support 41 and are pivotally mounted at 108 at their spaced positions. A cam follower 109, supported by a lower end of each lever 106, is urged to follow the contour of their respective cams 110 and 114 by springs 111. The cams 110 and 114 are mounted on the cam shaft 30 at spaced positions to be engaged by their followers and the contours of the cams causing the levers 106 to locate roller 105 in positions for intergagement with their yokes 94 and 103 after which the cams cause operation of the racks 92 and 101 to operate the cutters 80 and swaging elements 82. The operating mechanism for the rack 92 and its yoke 94 is identical to that for the rack 101 with the exception of the position of its cam 114 on the cam shaft 30. The cams 110 and 114 are positioned with respect to each other so that there is an interval of time between their actions. After the elements 82 have been operated by cam 110 to swage the leading end of the wire in the stud the cam 62 causes upward movement of the unit 35 prior to operation of the cutters 80. The free end of the wire swaged in the stud holds the wire against movement while the unit 35 returns to its full distance upwardly relative to the unit 36 to position the wire 25 in the unit 35 for the next feeding operation.

A unit 115 mounted at the next station is operated during the intervals of rest to cause forming tools 116 and 117 thereof to form partial bends 118 in the wire 25. At the next station unit 120 has tools 121 and 122 which cooperate to complete the S-bend 123 in the wire 25. At the next station nothing occurs, but at the final station, which has been described as an ejected station, suitable means may be directed to the lower end of each hollow chuck 14 to force jets and air upwardly into each chuck to eject the finished article which is released by the energization of the solenoid 20.

Operation

During operation of the apparatus the turret is moved intermittently about its axis and the feeding unit 28 is operated to feed the studs singularly to the chucks 14. After each chuck reaches the next station the motor 31 may be energized or, if operated continuously, a clutch may be closed to cause one revolution of the cam shaft 30. The cam 62 is the first to function in that it causes lowering of the unit 36 until it comes to rest on the block 40, to position the swaging elements 82 relaive to the upper portion 23 of the stud and position the yokes 94 and 103 in engagement with their cam levers. Additional function of the cam 62 to lower the rod 58 causes additional downward movement of the unit 35 until it comes to rest upon the stops 43 at which time the leading end of the wire 25 will be fed into the aperture of the stud. At this time cams 110, 62 and 114 will operate in their respective order. First, the cam 110 operates the swaging elements to secure the leading end of the wire in the stud. Before the cutters are operated through the action of the cam 114 the cam 62 moves the unit 35 vertically to advance the wire a measured distance through the wire feeding means to condition it for the next feeding operation. At that time the cutters are operated to cut the wire and the units 35 and 36 are returned to their starting positions. Before the unit 35 starts its upward movement the holder 63 for the latch 51 moves upwardly with the rod 58 to open the clamp for the wire moving the portion 46 free of the wire to permit upward movement of the feeding means of unit 35 relative to the held wire to condition the feeding means for the next feeding operation. After this relative movement has been completed, the latch 51 engages a stationary cam 54 which moves the latch to free the member 46 so that the wire again will be clamped.

At the next station units 115 and then 120 will form a S-bend in the wire and a completed article will be ejected at the final station.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for making articles of apertured studs and lengths of wire, means to locate studs successively at a fixed position, means operated adjacent the fixed position to feed the leading end of a supply of wire into the aperture of the stud, a unit having a housing apertured for feeding of the wire therethrough and into the stud, swaging elements movably disposed in the housing and radially positioned relative to the aperture therein, cutters movably disposed in the housing, spaced a given distance from the swaging elements and radially positioned relative to the aperture therein, means operable to move the unit between a normal position away from the stud and an operating position adjacent the stud, cams rockably disposed in the housing with respect to the swaging elements and the cutters to respectively move the elements to swage the leading end of the wire in the stud and move the cutters to cut the wire a given distance from the stud, arms having outer and inner ends, the inner ends thereof extending into the housing and slidably supported thereby, separate means connecting their inner ends operatively to their respective cams, and means operatively connected to the outer ends of the arms to actuate the arms at predetermined intervals to operate the cams.

2. In an apparatus for making articles of apertured studs and lengths of wire, means to locate studs successively at a fixed position, a wire feeding unit with a normally closed clamp to grip a wire and position a given length of the wire from the feeding unit with the leading end of the wire aligned with the aperture of the stud, a second unit with an aperture aligned with the wire and the stud having operable swaging elements and operable cutters extending at different levels radially from the aperture, means to support the units for vertical movement relative to each other and the stud, a rod supported for vertical movement and extending through the units, means to cause down and up movements of the rod between given limits, respective supporting members for the units to locate the units in operating positions, and respective supporting elements for the units disposed on the rod at predetermined positions to control movements of the units with and relative to each other.

3. In an apparatus according to claim 2 in which separate means are connected operatively to the swaging elements and the cutters when the second unit is moved into its operating position.

4. In an apparatus according to claim 3 in which the swaging elements are actuated by their operating means to swage the stud to secure the leading end of the wire therein and the cutters are actuated by their operating means to cut the wire a given distance from the stud subsequent to a first up movement of the feeding unit a given distance.

5. In an apparatus according to claim 4 in which a latch mounted on the rod engages the clamp when the feeding unit is in its down position to open the clamp to free the wire during the first up movement of the feeding unit.

6. In an apparatus according to claim 5 in which a cam is mounted in a path of the latch to actuate the latch free of the clamp so that the clamp may grip the wire during additional up movement and the down movement of the feeding unit.

References Cited in the file of this patent

UNITED STATES PATENTS

| | | |
|---|---|---|
| 1,761,521 | Eastman | June 3, 1930 |
| 2,340,448 | Andren | Feb. 1, 1944 |
| 2,677,173 | Fisler | May 4, 1954 |